(12) United States Patent
Boldizar et al.

(10) Patent No.: US 7,132,033 B2
(45) Date of Patent: Nov. 7, 2006

(54) METHOD OF FORMING A LAYERED POLISHING PAD

(75) Inventors: Mark J. Boldizar, Lancaster, PA (US); Robert T. Gamble, Boothwyn, PA (US); Vincent Matthew Hedrick, Weston, FL (US); Jason M. Lawhorn, Newark, DE (US); Alan H. Saikin, Landenberg, PA (US); Katherine L. Tome, Port Deposit, MD (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 211 days.

(21) Appl. No.: 10/788,951

(22) Filed: Feb. 27, 2004

(65) Prior Publication Data

US 2005/0189065 A1    Sep. 1, 2005

(51) Int. Cl.
    *B32B 37/02*    (2006.01)
(52) U.S. Cl. .................... 156/324; 156/253; 156/269
(58) Field of Classification Search .................. None
    See application file for complete search history.

(56) References Cited

U.S. PATENT DOCUMENTS

| 5,318,835 | A | * | 6/1994 | Sawamoto et al. ...... 428/317.7 |
| 5,413,941 | A | | 5/1995 | Koos et al. |
| 5,605,760 | A | | 2/1997 | Roberts |
| 5,716,687 | A | * | 2/1998 | Chumbley et al. ......... 428/41.8 |
| 5,893,796 | A | | 4/1999 | Birang et al. |
| 5,897,949 | A | * | 4/1999 | Luhmann et al. ......... 428/317.3 |
| 6,171,181 | B1 | | 1/2001 | Roberts et al. |
| 6,290,589 | B1 | | 9/2001 | Tolles |
| 6,358,130 | B1 | | 3/2002 | Freeman et al. |
| 6,477,926 | B1 | * | 11/2002 | Swisher et al. ............. 451/526 |
| 6,524,164 | B1 | | 2/2003 | Tolles |
| 6,623,337 | B1 | | 9/2003 | Scott et al. |
| 6,676,501 | B1 | * | 1/2004 | Beaudry ...................... 451/533 |
| 2003/0171081 | A1 | * | 9/2003 | Komukai et al. ........... 451/285 |
| 2005/0150594 | A1 | * | 7/2005 | Kodaka et al. .......... 156/307.7 |

* cited by examiner

Primary Examiner—Jessica Rossi
(74) Attorney, Agent, or Firm—Blake T. Biederman

(57) ABSTRACT

A method of forming a layered polishing pad is disclosed. The method includes double-laminating a subpad on opposing sides with respective adhesive layers and bonding a polishing pad top layer to the subpad via the upper adhesive layer. The polishing pad optionally includes a window. Because the subpad is double-laminated, an opening can be formed through both the top and bottom adhesive layers as well as the subpad. Thus, when bonded to a top polishing pad layer having a window, the result is a layered polishing pad with a through optical path that does not include an adhesive layer.

6 Claims, 5 Drawing Sheets

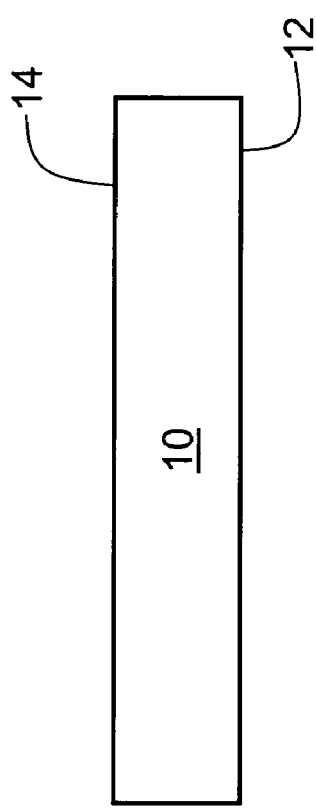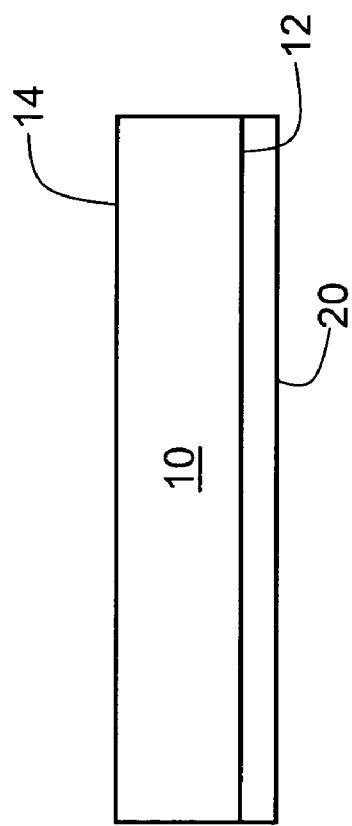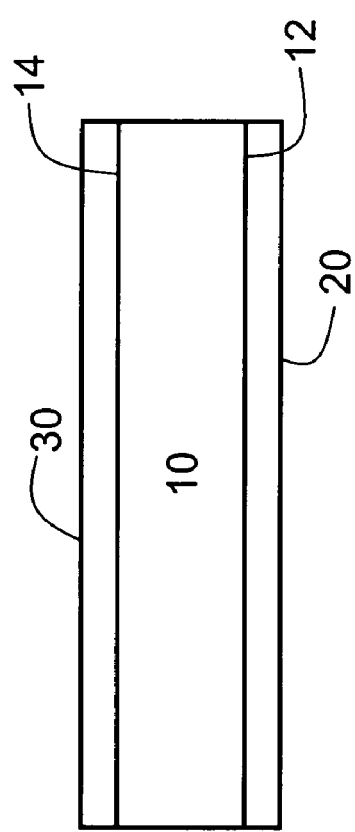

METHOD OF FORMING A LAYERED POLISHING PAD

BACKGROUND OF THE INVENTION

The present invention relates to polishing pads for chemical mechanical polishing (CMP), and in particular relates to methods of forming layered polishing pads, including such pads having windows.

Semiconductor wafers having integrated circuits fabricated thereon must be polished to provide a very smooth and flat wafer surface which in some cases may vary from a given plane by as little as a fraction of a micron. Such polishing is usually accomplished in a chemical-mechanical polishing (CMP) operation, which utilizes a chemically active slurry that is buffed against the wafer surface by a polishing pad.

One problem associated with the CMP operation is pad performance. Certain polishing pads are made up of layers of material. Over time, due the wear and tear of the polishing process, the bonds between the different material layers can weaken. This can result in delamination of the layered pad.

Another problem associated with the CMP operation is determining when the wafer polishing process should stop. Conventional methods for determining a polishing endpoint require that the polishing operation be stopped and that the wafer be removed from the polishing apparatus so that dimensional characteristics can be determined. However, stopping the CMP operation slows down wafer production. Further, if a critical wafer dimension is found to be below a prescribed minimum, the wafer may be unusable, thereby leading to higher scrap rates and production costs.

In-process methods for determining polishing endpoint have also been developed. For example, U.S. Pat. No. 5,413,941 discloses an optical inspection method that utilizes laser interferometry to measure a wafer dimension.

Polishing pads with windows have been developed to facilitate optical inspection methods during CMP. For example, U.S. Pat. No. 5,605,760 discloses a polishing pad that includes a transparent window. The window is a rod or plug of transparent polymer material. The rod or plug is either insert molded within the polishing pad, or is installed into a cutout in the polishing pad after the molding operation.

The prior art polishing pads with windows have a number of disadvantages. For instance, a number of manufacturing steps are required to either install a window piece into a hole in the pad, or into the mold cavity in which the pad is produced. In some cases, a hole to receive the window piece must be cut into the pad. Also, leakage of slurry between the pad and the window is often a problem.

U.S. Pat. No. 6,524,164 (the '164 patent) discloses a polishing pad having a transparent window and that is designed to mitigate leakage. The polishing pad includes an impermeable transparent sheet between the polishing pad and the subpad to prevent slurry leakage. To fabricate the pad, the transparent sheet needs to have an adhesive layer on each side, and the sheet needs to be laminated to the lower surface of the polishing pad. This leaves a double-sided adhesive layer on the lower side of the pad window.

While the pad of the '164 patent initially performs well, the transparency of the adhesive layer on the window degrades over time. This can reduce the effectiveness of the optical inspection processes.

STATEMENT OF THE INVENTION

A first aspect of the invention is a method of forming a layered polishing pad comprising: forming a first double-sided adhesive layer on a bottom surface of a subpad; forming a second double-sided adhesive layer on a top surface of the subpad; providing a polishing pad layer having a lower surface; and adhering the polishing pad layer to the subpad by pressing the polishing pad layer lower surface against the second adhesive layer.

A second aspect of the invention is a method of forming a layered polishing pad, comprising: laminating a first double-sided adhesive layer onto a bottom surface of a subpad; laminating a second double-sided adhesive layer on a top surface of the subpad; forming an opening through the first adhesive layer, the subpad and the second adhesive layer; and securing a polishing pad having a window formed therein, to the subpad with the second adhesive layer, such that the window is aligned to the opening.

BRIEF DESCRIPTION OF THE DRAWINGS

FIG. 1 is a side view of a subpad showing the top and bottom opposing surfaces;

FIG. 2 is a side view of the subpad of FIG. 1, further showing a first adhesive layer formed on the bottom surface of the subpad;

FIG. 3 is side view similar to that of FIG. 2, further showing a second adhesive layer formed on the top surface of the subpad;

DETAILED DESCRIPTION OF THE INVENTION

Figure 4:
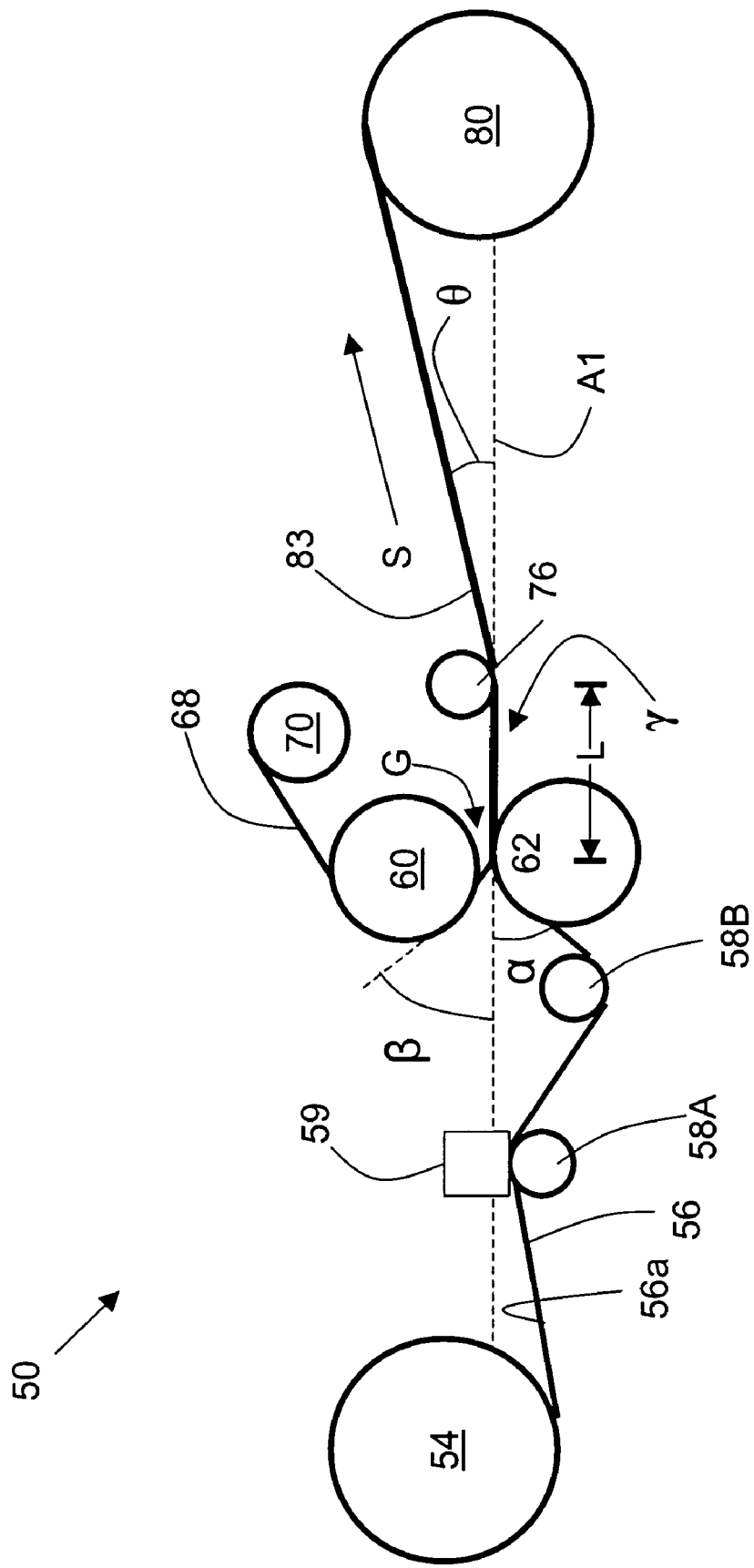
FIG. 4 is a schematic diagram of laminating apparatus used in an example embodiment to form the first and second adhesive layers on the subpad surfaces, as shown in FIG. 3.

The present invention is a method of forming a layered polishing pad. The present invention includes a method of forming a layered polishing pad having an adhesive-free window.

The method of the present invention is described below in connection with FIGS. 1–6, which illustrate the various structures formed along the way to create the final layered polishing pad. The resulting layered polishing pad structure formed by the method of the present invention is illustrated in FIG. 7. The polishing pad structure shown in FIG. 7 includes a window. However, the layered polishing pad of the present invention need not include the window.

With reference to FIG. 1, the method includes providing a polishing pad subpad 10 ("subpad") having a bottom surface 12 and a top surface 14. Subpad 10 is any known subpad material, such as SUBA IV porous polyurethane, made by Rohm and Haas Electronic Materials Technologies, Newark, Del. In an example embodiment, subpad 10 is provided in "roll-good" form, i.e., from a roll of material, as described in greater detail below.

With reference now to FIG. 2, the method also includes forming a first adhesive layer 20 on bottom surface 12 of subpad 10. In an example embodiment, adhesive layer 20 is formed using double-sided pressure sensitive adhesive (PSA). In an example embodiment, forming adhesive layer 20 is accomplished by providing the adhesive material in roll-good form and laminating the material to subpad 10, which is also provided in roll-good form. In an example embodiment, the combination of subpad 10 plus adhesive layer 20 is collected on a rewind drum and stored in roll-good form, as described in greater detail below.

In an example embodiment, adhesive layer 20 is PSAII or PSAIV rubber-based adhesive (5 to 9 mils or 0.13 to 0.23 mm) sold with pads by Rohm and Haas Electronic Materials CMP Technologies. Adhesive layer 20 is for adhering the final polishing pad to the CMP tool platen (not shown), and so preferably is capable of providing a releasable (i.e., non-permanent) bond. Adhesive layer 20 includes a thin peel-away covering or film (not shown), such as paper or MYLAR (a trademark of Dupont Corporation), which is later peeled away to expose the adhesive.

With reference now to FIG. 3, the method further includes forming a second adhesive layer 30 on top surface 14 of subpad 10. In an example embodiment, second adhesive layer 30 is double-sided PSA provided in roll-good form. Further in the example embodiment, the method of the present invention includes providing the subpad material with adhesive layer 20 formed therein in roll-good form, as explained above, and laminating adhesive layer 30 to subpad top surface 14.

In an example embodiment, adhesive layer 30 is PSAV (acrylic-based adhesive) or PSA8 (rubber-based adhesive) sold with stacked pad configurations by Rohm and Haas Electronic Materials CMP Technologies each having a thickness of 4 to 9 mils (0.1 to 0.2 mm). As described below, adhesive layer 30 is for adhering the subpad to the top polishing pad layer, and so preferably is capable of providing a permanent bond. Like adhesive layer 20, adhesive layer 30 also includes a thin peel-away covering film (not shown), which is later peeled away to expose the adhesive.

The double-lamination of the subpad 10 with adhesive layers 20 and 30 is a more difficult and involved process than simply laminating one side of a subpad. The presence of an existing adhesive layer on the subpad introduces tensions in the subpad material, as well as differential stresses at the interface between the adhesive layer and the subpad. Further, improper lamination of the adhesive layers can create stresses that result in curling of the subpad and wrinkling of one or both of the adhesive layers. In addition, the peal-away covering on certain adhesive layers used to form layer 30 is, in certain cases, preferably non-elastic (or substantially so) to reduce stresses on the double-laminated subpad. Thus, an example embodiment of the double-lamination process of the present invention is now explained in greater detail below.

FIG. 4 is a schematic side-view of a lamination apparatus 50 illustrating an example arrangement for laminating adhesive layers 20 and 30 on opposite sides 12 and 14 of subpad 10. Apparatus 50 includes a material unwind spool 54 that holds material 56 in roll-good form. The feed angle α of material 56 (measured relative to a central axis A1) is adjustable and is set and maintained via adjustable feed rollers 58A and 58B. Material 56 may be material for subpad 10 or may be the single-laminated combination of subpad 10 and adhesive layer 20. Apparatus 50 also includes a web cleaner 59, such as a vacuum cleaner, for cleaning the upper surface 56a of material 56 prior to it being laminated.

Apparatus 50 includes downstream of feed roller 58B two nip rollers 60 and 62 arranged adjacent each other on either side of axis A1 and separated by small gap G, called the "Nip gap." Nip roller 60 assists in dispensing adhesive material 68 stored on an adhesive unwind spool 70. Nip roller 60 is adjustable so that applied pressure of the adhesive to the roll-good material can be adjusted. The adhesive material is that which forms either adhesive layer 20 or 30, depending on the stage of the lamination process. Nip roller 60 is heated to facilitate the lamination of the adhesive to particular subpad surface, while nip roller 62 is unheated. Adhesive material 68 is fed into the nip gap at an angle β, which is adjustable by adjusting the position of nip roller 60.

When forming adhesive layer 30, apparatus 50 includes an idler bar 76 arranged downstream of the nip rollers. Idler bar 76 is arranged to receive and horizontally guide the now-laminated material 83 from the nip rollers, for reasons explained below. A rewind drum 80 is arranged downstream of idler bar 76, and is adjustable so that the take-up angle θ (relative to axis A1) of the laminated material 83 exiting the idler bar can be adjusted. Rewind drum 80 is also present when forming adhesive layer 20, and in the absence of idler bar 76 takes up material 83 directly as it exits the nip rollers.

Idler bar 76 is adjustable so that the laminated material 83 travels a length L (the "travel length") and maintains the laminated material at a nip exit angle γ (measured relative to axis A1) over the travel length L, as discussed below. The FIG. 4 illustrates the most preferred γ angle of zero degrees.

With continuing reference to FIG. 4, subpad material 56 is provided in roll-good form and placed on material unwind spool 54. Likewise, adhesive material 68 suitable for forming adhesive layer 20 is provided in roll-good form and placed on adhesive unwind spool 70. Subpad material 56 travels over feed rollers 58A and 58B and is fed into the nip gap G at a select feed angle α.

Likewise, adhesive material 68 is guided over a portion of heated nip roller 60 and fed into the nip gap G. The subpad material 56 and the adhesive material 68 are fed at a select speed S (called the "line speed", indicated by arrow S) and are laminated by the combination of the heating of the adhesive material and the pressing force of the nip rollers. The now-laminated material 83 exits the nip rollers and is then collected in roll-good form at rewind drum 80.

At this point, the roll-good laminated material 83, which is now made up of subpad 10 and adhesive layer 20, is taken from the rewind drum and placed on the material unwind spool 54 in a manner that will allow for the unlaminated side of the subpad to be laminated. Alternatively, the roll-good laminated material 83 can be re-rolled to provide the proper unwind orientation. Adhesive material suitable for forming adhesive layer 30 is provided in roll-good form and placed on adhesive unwind spool 70.

The lamination process described above for forming adhesive layer 20 onto the subpad bottom surface is now repeated to form adhesive layer 30 on the subpad top surface, but with the idler bar present so that laminated material 83 travels a travel length L at a select nip exit angle γ prior to being taken up by rewind drum 80.

In the double-lamination process described above, it is important that any differential stresses induced by laminating either or both of adhesive layers 20 and 30 be minimal or equal in both layers so that curling or wrinkling does not occur. To this end, the process parameters in the form of the line speed S, the feed angles α and β, the exit angle θ, the nip exit angle γ and the travel length L need to be properly selected. Of these parameters, the nip exit angle γ and the travel length L are of particular importance.

The travel length L as determined by idler bar 76 is selected so that the laminated material 83 is properly cured prior to being taken up by rewind drum 80. Likewise, the nip exit angle γ is selected by arranging the idler bar 76 so that layer 20 properly sets atop material 56 (i.e., the subpad top surface 14). In an example embodiment, the nip exit angle γ=0° to within about +/−3°.

It is important to note that this arrangement for forming adhesive layer 30 on subpad 10 is unconventional for a typical laminating apparatus. Most laminating apparatus have a significant nip exit angle to maintain tension control of the material as is moves through the apparatus.

The process parameters for laminating adhesive layer 30 using apparatus 50 are best deduced through testing a number of parameter combinations for given subpad and adhesive materials.

Table 1 lists example empirically derived parameters for forming adhesive layer 30 on top surface 14 of a subpad 10 that already has an adhesive layer 20 formed on the bottom surface.

TABLE 1

Example Process Parameters

| Parameter | Description |
| --- | --- |
| Adhesive material | Avery Dennison FT9300 (PSA with paper peal-way covering) |
| Subpad material | SP2150 porous polyurethane roll-good from Rohm and Haas Electronic Materials CMP Technologies |
| Line Speed S | 10 ft/min (3 m/min.) |
| Travel length L | 2 ft (0.61 m) |
| Nip gap | 5 mils (0.127 mm) |
| Unwind load for unwind spool 54 | 25 lbs. (11 Kg) |
| Unwind load for adhesive material unwind spool 70 | 10 lbs (4.5 Kg) |
| Material feed angle α | 65° +/− 10° |
| Adhesive material feed angle β | 45° +/− 10° |
| Nip exit angle γ | 0° +/− 3° |

Figure 5:
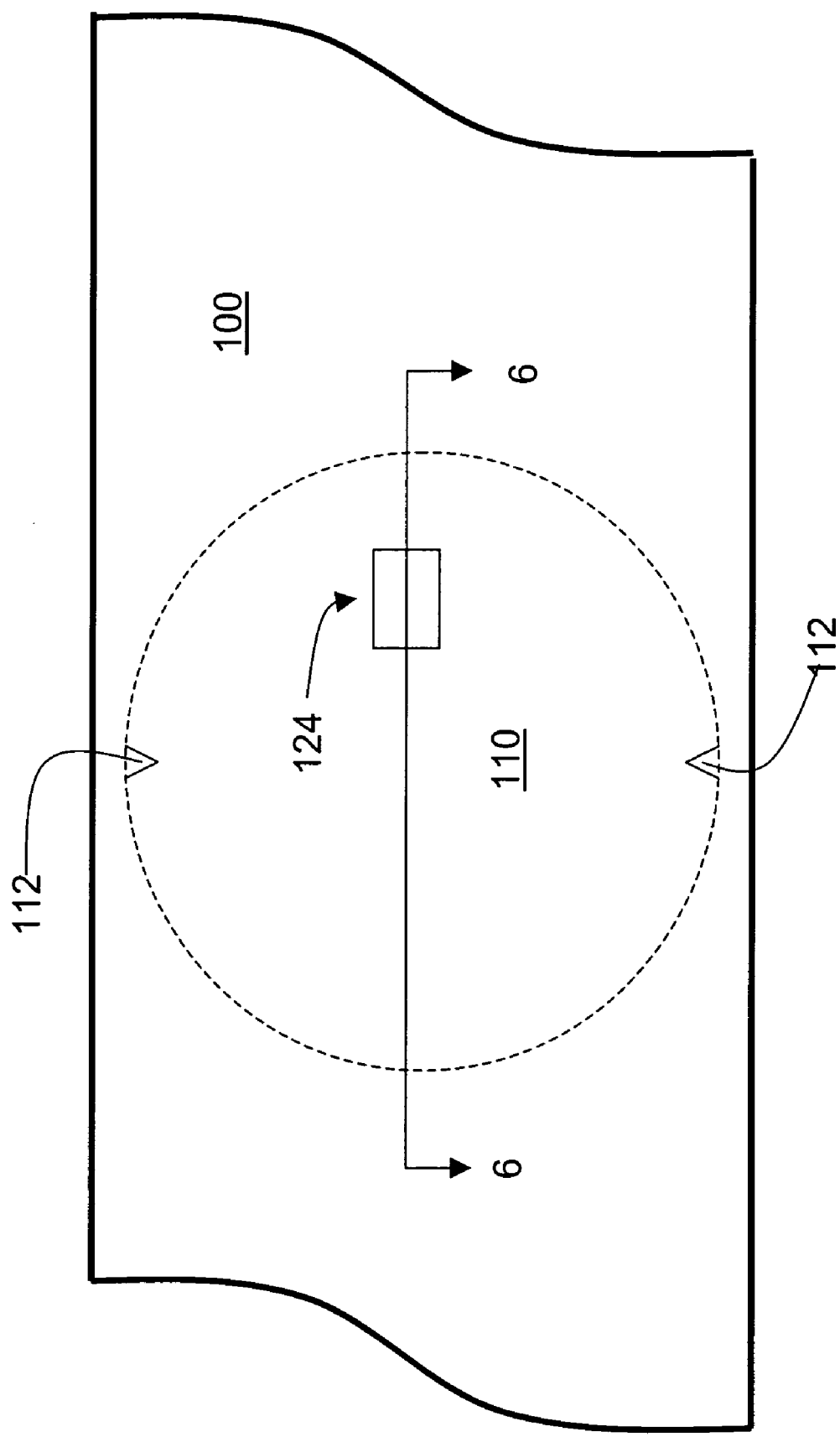
FIG. 5 is a top-down view of a double-laminated sheet formed using the laminating apparatus of FIG. 4, showing how a double-laminated subpad is cut out from the sheet, and also showing an optional opening and alignment marks for the windowed layered polishing pad embodiment.

With reference to FIG. 5, using the lamination method described above in connection with apparatus 50, the double-laminated structure consisting of subpad 10 with adhesive layers 20 and 30 (FIG. 3) (hereinafter, the "double-laminated subpad") is dispensed in roll-good form as a sheet 100. Accordingly, the method of present invention includes forming double-laminated subpads 110 having a desired shape (e.g., circular) by cutting them from sheet 100. The description below refers to the cut double-laminated subpads 110 for the sake of simplicity.

Figure 6:
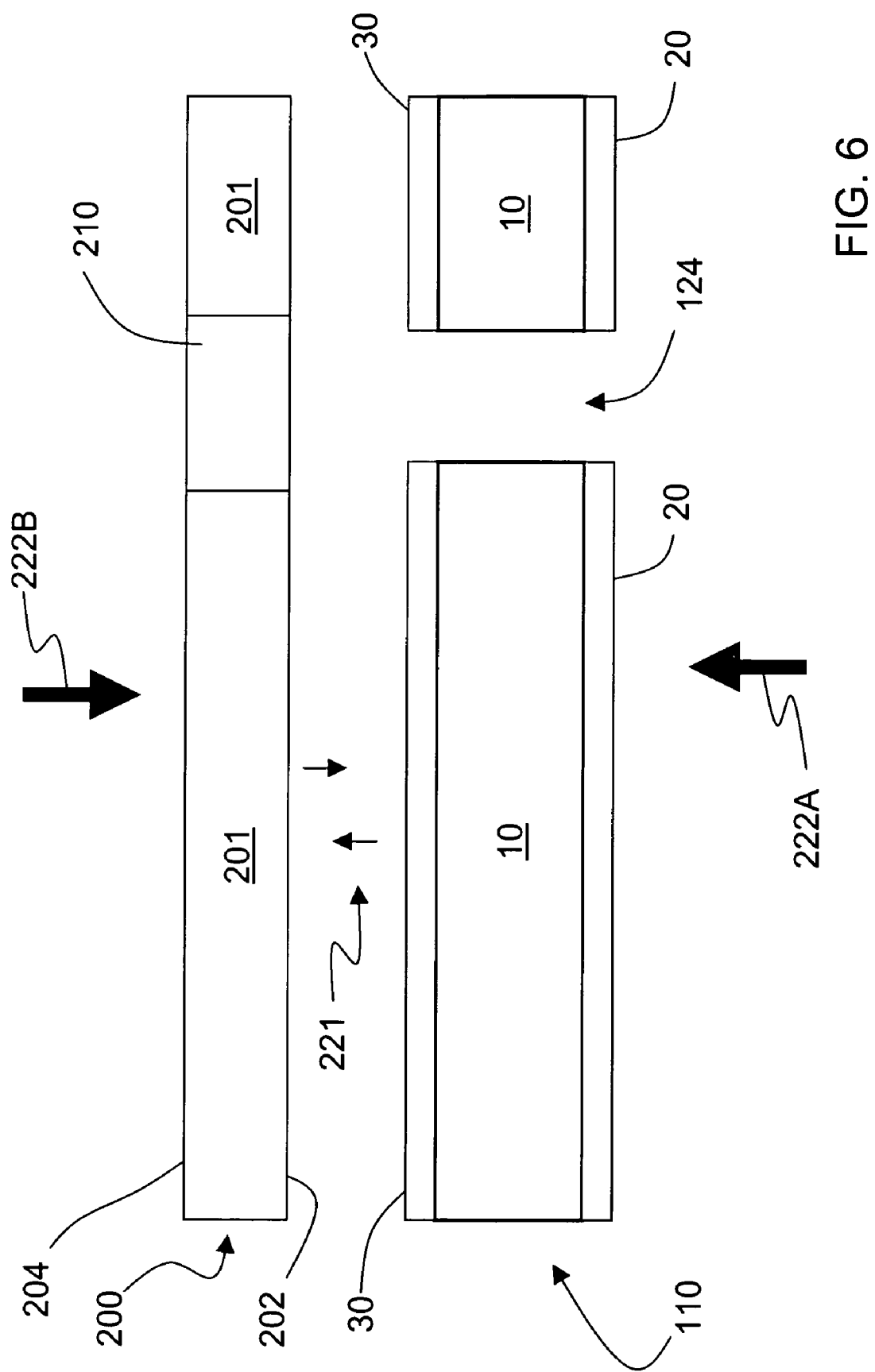
FIG. 6 is a cross-sectional diagram of the double-laminated subpad taken along the line 6—6 in FIG. 5, illustrating the optional opening through the double-laminated subpad, and also showing the polishing pad being interfaced with the subpad, with the window aligned with the opening.
Figure 7:
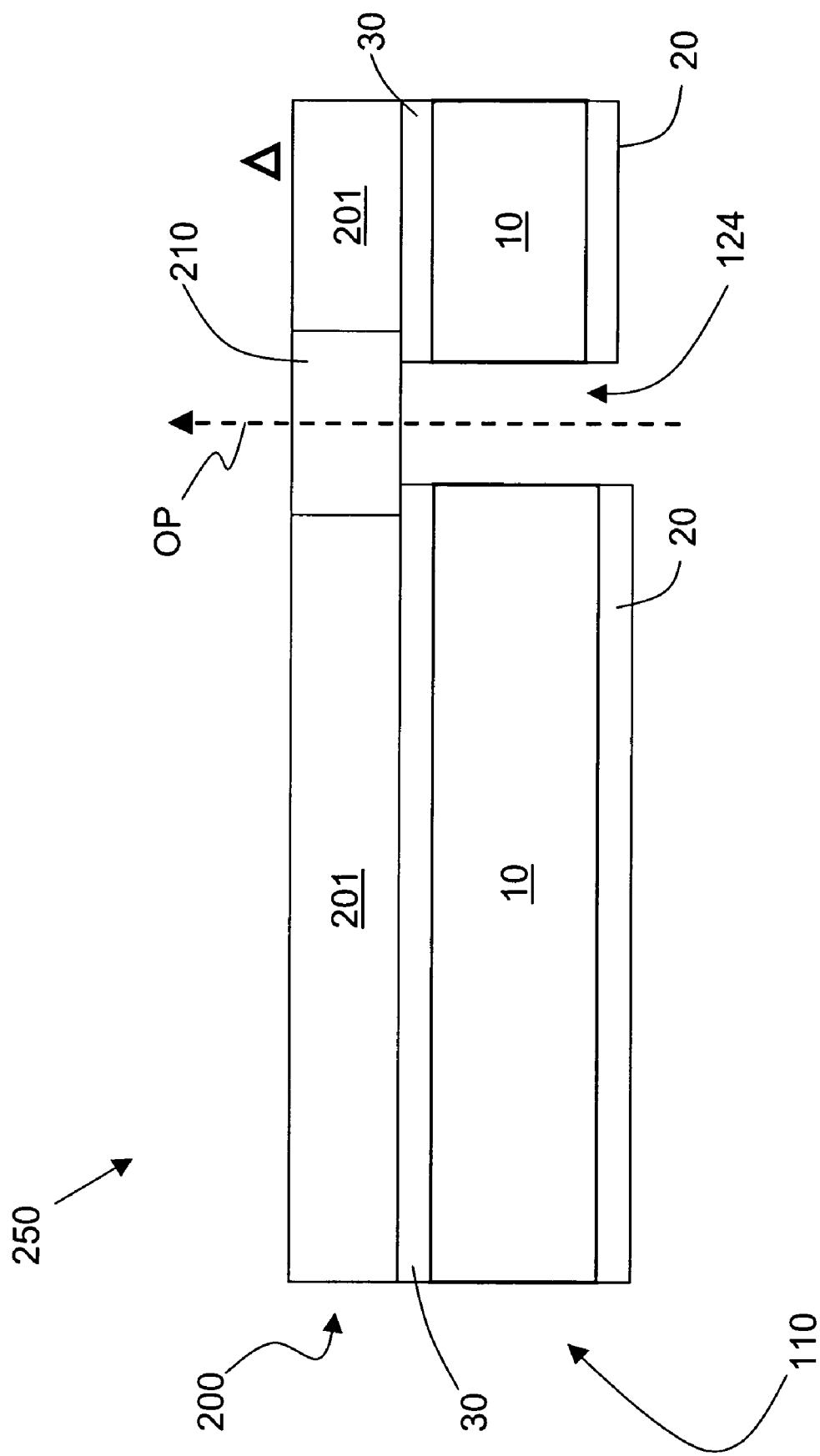
FIG. 7 is a cross-sectional diagram of the final layered polishing pad structure formed by the method of the present invention, illustrating the example embodiment that includes a window and an optical path therethrough that has no adhesive layer.

With continuing reference to FIG. 5 and also to FIG. 6, an example embodiment of present invention includes a method of forming a layered polishing pad having a window. Thus, the method of the present invention optionally includes forming an opening 124 that passes through double-laminated subpad 110, i.e., through adhesive layer 20, subpad 10 and adhesive layer 30. The method also includes forming alignment marks (e.g., notches or bumps) 112 on adhesive layer 30 to assist with aligning with a polishing pad top layer, in forming the final layered polishing pad, as described below. In an example embodiment, the cutting of double-laminate subpad 110 from sheet 100, the formation of opening 124, and the formation of alignment marks 112 is performed by a single cutting tool operating on sheet 100.

With continuing reference to FIG. 6, the method further includes providing a polishing pad top layer 200 (hereinafter, "polishing pad") having a body portion 201, lower surface 202 and an upper surface 204. In the embodiment of the present invention that involves forming a layered polishing pad having a window, polishing pad 200 also includes a window 210 formed integral with body portion 201 and extending from lower surface 202 to upper surface 204. In an example embodiment, body portion 201 is formed from a polyurethane material, such as an IC 1000™ polishing pad, made by Rohm and Haas Electronic Materials CMP Technologies. Window 210 is adapted to transmit light from an optical beam used by an optical inspection apparatus (not shown) while polishing a substrate during a CMP operation.

Also in an example embodiment, window 210 is preferably formed from a polyurethane material cast along with the body portion and processed along with the body portion. Because window 210 is formed integral with the body portion of the polishing pad, there is no leakage problem such as associated with plug windows or other types of non-integrally formed polishing pad windows. Optionally, sealed in place plug-type or sheet-type windows will operate with the method of the invention. Also in an example embodiment, window 210 is slightly larger than opening 124 so that the window is supported by a ledge in the final layered polishing pad (FIG. 7).

In an example embodiment, polishing pad 200 includes one or more alignment marks (not shown) that are used in combination with alignment marks 112 to align window 210 with opening 124 in the final layered polishing pad structure. Proper alignment of window 210 to opening 124 helps prevent trapping air when the double-laminated subpad 110 is interfaced with polishing pad 200.

With continuing reference to FIG. 6, polishing pad 200 is arranged adjacent double-laminated subpad 110, with polishing pad lower surface 202 facing adhesive layer 30. In the case where adhesive layer 30 is a PSA layer, the peel-away covering (not shown) is removed from adhesive layer 30.

Further, for the windowed pad embodiment, window 210 is aligned with opening 124 (e.g., via the alignment marks, as discussed above). Polishing pad 200 and double-laminated subpad 110 are then brought together (as indicated by the small arrows 221) and pressed against one another (as indicated by arrows 222A and 222B) so that adhesive layer 30 bonds (i.e., adheres or secures) them together. In an example embodiment, the required pressing is accomplished by interfacing the polishing pad 200 with the double-laminated subpad as described above, and then passing the combined structure through nip rollers, which squeeze the polishing pad and the subpad together.

Because the subpad includes the bonding adhesive layer 30, the applied pressure is more evenly distributed across the top pad bottom surface, resulting in a more consistent and predictable bond. This, in turn, results in a final polishing pad structure that is less likely to delaminate over time.

The final layered polishing pad structure 250 is illustrated in FIG. 7. Note that there is no adhesive layer present on optional window 210. Thus, the optical path through the final layered pad structure (the "through optical path"), as indicated by arrow OP, does not include an adhesive layer.

This is advantageous because, as mentioned above, such an adhesive layer is known to reduce the effective optical transmission of the window and ultimately, the optical monitoring of the CMP process. As mentioned above, the final polishing pad structure 250 illustrated in FIG. 7 need not include window 210 or opening 124.

What is claimed is:

1. A method of forming a layered polishing pad comprising:
   a) forming first and second double-sided pressure sensitive adhesive layers on a bottom and top surfaces of a subpad, respectively, with a nip roller to form a double laminated subpad, the double laminated subpad having a nip exit angle γ through the nip roller and wherein the first and second double-sided pressure sensitive adhesive layers can create stresses that result in curling of the double laminated subpad;
   b) controlling nip exit angle γ to 0 degrees±3 degrees over a travel length to limit curling of the double laminated subpad;
   c) providing a polishing pad layer having a lower surface; and
   d) adhering the polishing pad layer to the double laminated subpad, the double laminated subpad including the first and second double-sided pressure sensitive adhesive layers adhered to the bottom and top surfaces, by pressing the polishing pad layer lower surface against the second double-sided pressure sensitive adhesive layer.

2. The method of claim 1, further including after act b) therein:
   a) forming an opening that extends through the first double-sided pressure sensitive adhesive layer, the subpad and the second double-sided pressure sensitive adhesive layer;
   b) providing the polishing pad layer with a window; and
   c) in the adhering, aligning the window to the opening.

3. The method of claim 1, including respectively providing material for the subpad and the first and second double-sided adhesive pressure sensitive layers in roll-good form.

4. A method of forming a layered polishing pad, comprising:
   a) laminating first and second double-sided pressure sensitive adhesive layers onto bottom and top surfaces of a subpad, respectively, with a nip roller to form a double laminated subpad, the double laminated subpad having a nip exit angle γ through the nip roller and wherein the first double-sided pressure sensitive adhesive layer can create stresses that result in curling of the subpad;
   b) controlling nip exit angle γ to 0 degrees±3 degrees over a travel length to limit curling of the double laminated subpad;
   c) forming an opening through the first pressure sensitive adhesive layer, the subpad and the second pressure sensitive adhesive layer of the double laminated subpad; and
   d) securing a polishing pad having a window formed therein, to the double laminated subpad with the second adhesive layer, such that the window is aligned to the opening in the double laminated subpad.

5. The method of claim 4, including providing respective materials for the subpad, the first double-sided pressure sensitive adhesive layer and the second double-sided pressure sensitive adhesive layer in roll-good form.

6. A method of forming a layered polishing pad comprising:
   a) sequentially forming respective double-sided pressure sensitive adhesive layers on opposing surfaces of a subpad with a nip roller to form a double-laminated subpad, the double laminated subpad having a nip exit angle γ through the nip roller and wherein the double-sided pressure sensitive adhesive layers can create stresses that result in curling of the double-laminated subpad;
   b) controlling nip exit angle γ to 0 degrees±3 degrees over a travel length to limit curling of the double laminated subpad;
   c) fanning an opening through the double-laminated subpad; and
   d) securing a polishing pad having a window, to the double-laminated subpad by pressing a polishing pad lower surface against one of the pressure sensitive adhesive layers such that the window and opening form a through optical path that includes no pressure sensitive adhesive layer.

* * * * *